United States Patent [19]
Lynch, Jr. et al.

[11] Patent Number: 5,127,577
[45] Date of Patent: Jul. 7, 1992

[54] TRACK CIRCUIT RETAINER CLIP

[75] Inventors: Edward J. Lynch, Jr., Akron; Raymond S. Laughlin, Cuyahoga Falls, both of Ohio

[73] Assignee: Erico International Corporation, Solon, Ohio

[21] Appl. No.: 354,388

[22] Filed: May 19, 1989

[51] Int. Cl.⁵ .................. E01B 11/54; E01B 09/48
[52] U.S. Cl. .................. 238/378; 238/14.14; 238/351; 248/72
[58] Field of Search .............. 238/14.14, 310, 351, 238/378, 349, 323; 191/23 A; 411/174, 175, 522, 523, 524; 248/74.2, 72

[56]         References Cited
          U.S. PATENT DOCUMENTS
2,332,855  10/1943  Jones ............................ 248/72
4,826,078   5/1989  Arvin et al. .................. 238/351

*Primary Examiner*—Joseph F. Peters, Jr.
*Assistant Examiner*—Virna Lissi Mojica
*Attorney, Agent, or Firm*—Renner, Otto, Boisselle & Sklar

[57]              ABSTRACT

A track circuit retainer clip for a running rail adapted to secure a conductor extending perpendicular to the rail around the edge of the base of the rail in close proximity therewith. The clip includes a U-shape spring metal body having upper and lower legs adapted to embrace the edge of the base of the rail. Each leg includes a center section bowed outwardly adapted to embrace the conductor and hold it tightly against the top and bottom of the rail base edge. The legs of the clip include inwardly directed tangs or barbs struck from the edge of the legs, the inwardly projecting tip of each tang being truncated to provide a linear biting edge to engage the top and bottom of the rail base with a line contact extending longitudinally of the rail or normal to the direction of insertion of the clip. In the unstressed form of the clip the truncated edges extend inwardly away from the edges at a slight angle so that as the clip is stressed when driven on the rail base the spring of the center sections brings the truncated biting edges of the tangs into substantially uniform pressure longitudinal line contact with the top and bottom of the rail base.

7 Claims, 1 Drawing Sheet

U.S. Patent  July 7, 1992  5,127,577
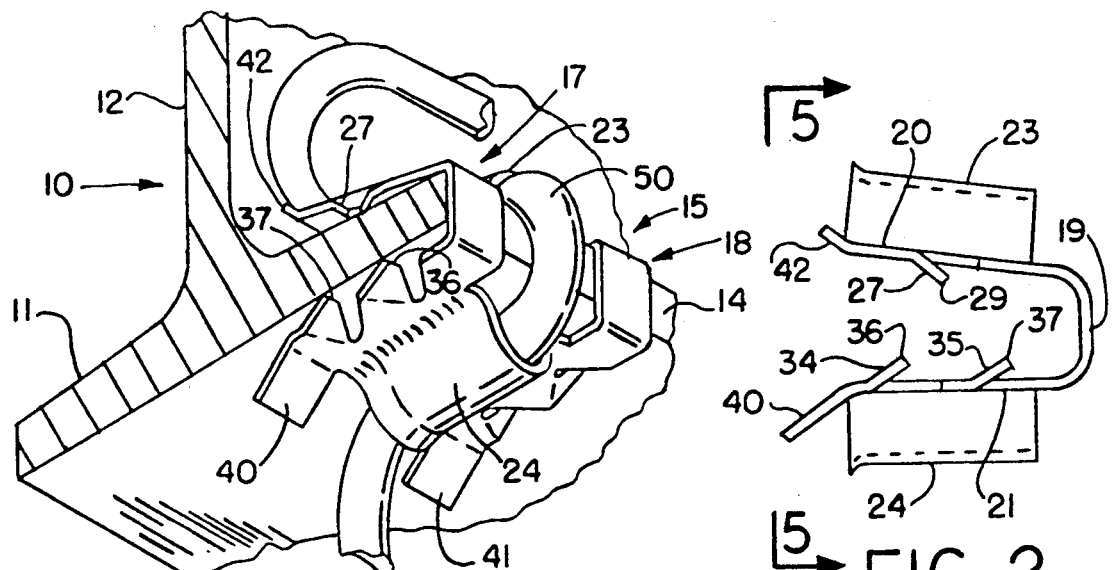
FIG. 1
FIG. 2
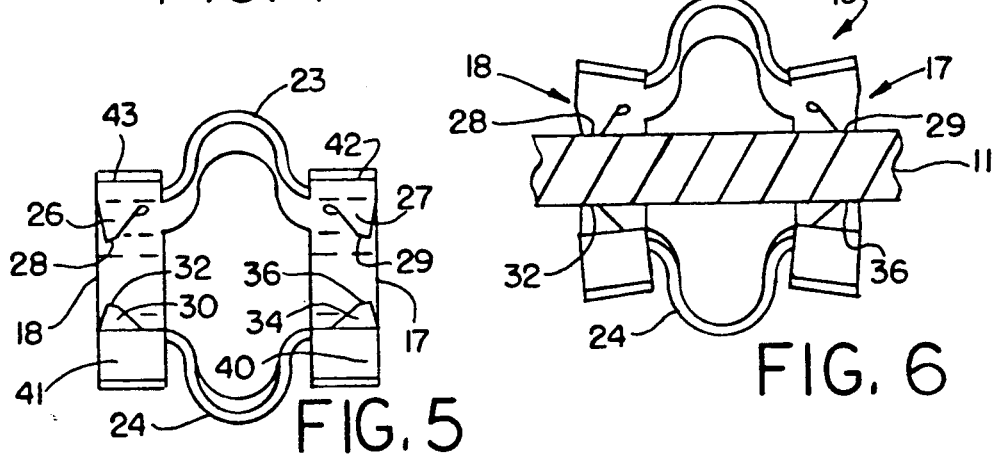
FIG. 5
FIG. 6
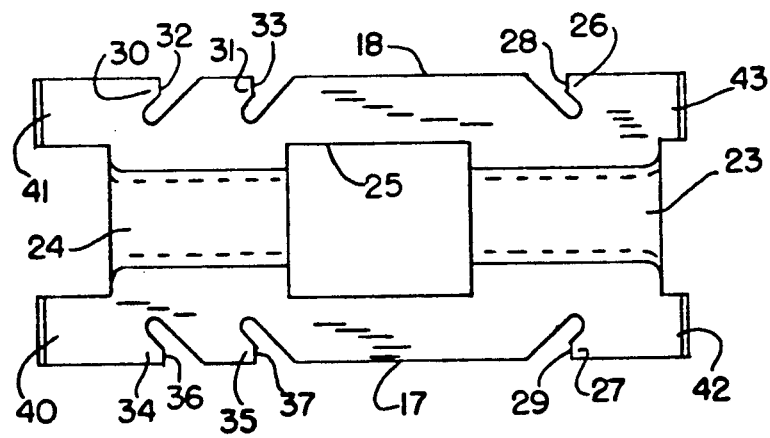
FIG. 3
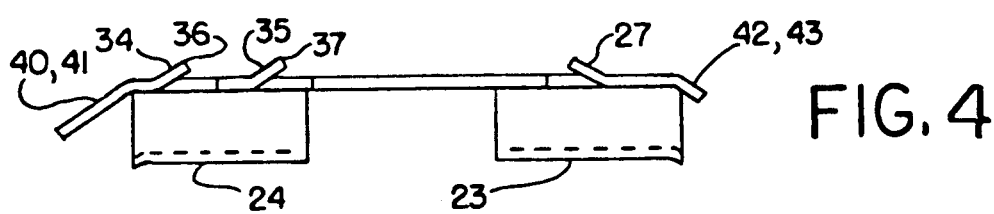
FIG. 4

5,127,577

TRACK CIRCUIT RETAINER CLIP

BACKGROUND OF THE INVENTION

Track circuits for railroad tracks require electrical conductor wires or cables connected to the rails or extending between the rails. Such conductors are used for a variety of switching, signaling or power purposes. The conductors if not secured properly may tend to flop loose, and if not secured or stowed properly the conductor may be caught on something and ripped loose. Accordingly the conductor should be secured or stowed neatly with respect to the edge of the base of the rail. This is particularly true where the conductor changes direction to pass under the rail. The bend of the conductor around the edge of the base of the rail should be as close as possible to the edge and not project or loop needlessly beyond the edge.

A clip known as a perpendicular clip in the form of a U-shape spring clip with each leg one above and one below the base, has been provided, each leg having an outwardly extended U-shape section. Such sections capture the conductor between the section and the rail base both above and below the base. In this manner the conductor may be folded tightly around the longitudinal edge of the base and secured by the clip.

The clip is designed to be hammered into place over the conductor and to facilitate the gripping of the rail the legs of the clip are provided with sharp struck pointed tangs or prongs. Such clips are difficult to install particularly for heavier rail which is widely used today.

It has been discovered that such sharp pointed tangs or barbs could form a small transverse scratch on the rail during installation which could be deleterious to some rails because of notch sensitivity. It was also discovered that when installed such sharp pointed barbs, providing point contact, did not provide adequate holding power or gripping to keep the clip and thus the conductor in place.

Accordingly there is a need for such a perpendicular clip which will not scratch or mar the rail when installed, which is easier to install, and which has significantly better holding or gripping power.

SUMMARY OF THE INVENTION

A track circuit retainer clip for a running rail adapted to secure a conductor extending perpendicular to the rail around the edge of the base of the rail in close proximity therewith. The clip includes a U-shaped spring metal body having upper and lower legs adapted to embrace the edge of the base of the rail. Each leg includes a center section bowed outwardly adapted to embrace the conductor and hold it tightly against the top and bottom of the rail base edge. The legs of the clip include inwardly directed tangs or barbs struck from the edge of the legs, the inwardly projecting tip of each tang being truncated to provide a linear biting edge to engage the top and bottom of the rail base with a line contact extending longitudinally of the rail or normal to the direction of insertion of the clip. In the unstressed form of the clip the truncated edges extend inwardly away from the edges at a slight angle so that as the clip is stressed when driven on the rail base the spring of the center sections brings the truncated biting edges of the tangs into substantially uniform pressure longitudinal line contact with the top and bottom of the rail base.

To the accomplishing of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWING

In the annexed drawing:

FIG. 1 is a fragmentary isometric view of a clip mounted on the edge of a rail base and securing a conductor in place;

FIG. 2 is a side elevation of the clip;

FIG. 3 is a plan view of the clip partially formed;

FIG. 4 is a side or edge elevation of the partially formed clip as seen from the bottom of FIG. 3;

FIG. 5 is an elevation of the open end of the clip as seen from the line 5—5 of FIG. 2 showing the biting edges of the tangs in the unstressed condition of the clip; and FIG. 6 is a view similar to FIG. 5 showing the clip on the rail base which is in longitudinal section.

DETAILED DESCRIPTION OF THE PREFERRED EMBODIMENTS

Referring initially to FIG. 1 there is illustrated a rail shown generally at 10 which includes a rail base 11. A web 12 projects upwardly from the center of the base to support the enlarged top of the rail on which the railroad cars and engines ride. The rail base includes a longitudinally extending lateral edge 14 on which the clip shown generally at 15 of the present invention may be driven as by a hammer.

The clip 15 includes generally parallel U-shape portions 17 and 18 each of which includes a bight portion 19, an upper leg 20 and a lower leg 21. The two lateral portions of the clip are interconnected by an upwardly extending U-shape portion 23 extending transversely between the upper legs and a downwardly extending U-shape portion 24 extending transversely between the lower legs.

As seen in FIGS. 3 and 4 the clip is formed of a flat blank which includes a center opening 25 and which is somewhat wider (top to bottom) than the blank illustrated in FIG. 3. After the U-shaped portions 23 and 24 are formed, the blank has the configuration seen in FIGS. 3 and 4. The blank is then formed as seen in FIGS. 2 and 5.

In the forming process the lateral portions 17 and 18 of the upper legs are provided with inwardly directed tangs or barbs seen at 26 and 27 which are provided with truncated linear edges 28 and 29, respectively. As indicated the barbs are struck from the edges of the clip and extend toward the bight portion 19 as the clip is ultimately formed.

Also struck from the same outer edge of the portion 18 are barbs 30 and 31 which likewise are provided with truncated or linear biting edges seen at 32 and 33, respectively. Barbs 34 and 35 are struck from the outer edge of the portion 17 and are also provided with truncated linear biting edges seen at 36 and 37.

The lower leg portion ends of the lateral portions 17 and 18 are bent downwardly as indicated at 40 and 41 while the opposite ends of such lateral portions forming the upper legs are also bent downwardly but to a lesser extent as seen at 42 and 43. When the clip blank seen in FIGS. 3 and 4 is transversely bent through the center to form the U-shape configuration seen in FIG. 2, the relatively short downward bends 42 and 43 become upward bends and in this manner the left hand side of the clip or mouth as seen in FIG. 2 has a flaring opening which facilitates the driving of the clip on the rail base edge 14. It is also noted that the clip when formed into its final U-shape configuration seen in FIG. 2 positions the truncated biting edge 29 approximately midway between the biting edges 36 and 37 which are on the barbs 34 and 35 struck from the lower legs edges.

As noted in FIG. 5 the truncated edges illustrated extend at a slight angle to the longitudinal direction of the rail. In other words the edges extend upwardly or downwardly at a slight angle from the lateral edges of the clip.

As seen in FIG. 6, as the clip is driven on the rail base edge the clip becomes stressed and not only do the leg portions 20 and 21 tend to open but the outer edges of the leg portions tend to cant away from each other with the clip flexing through the transverse U-shape portions 23 and 24. This then brings the linear truncated biting edges into parallelism with the upper and lower surfaces of the rail base and provides a uniform gripping force along the linear extent of the biting edges, such edges being in parallelism with the rail or the rail base edge.

With the clip of the present invention a cable such as seen at 50 in FIG. 1 may readily be captured as the clip is driven on the rail base edge holding the cable tightly against the rail base edge and extending perpendicular to such edge. The configuration of the biting edges not only makes the clip easier to install but its installation may be accomplished without scratching or notching the rail and moreover, significantly better gripping of the rail base is obtained.

Although the invention has been shown and described with respect to certain preferred embodiments, it is obvious that equivalent alterations and modifications will occur to others skilled in the art upon the reading and modifications of this specification. The present invention includes all such equivalent alterations and modifications, and is limited only by the scope of the following claims.

What is claimed is:

1. A track circuit spring metal clip for rails comprising a U-shape clip having upper and lower legs adapted to be driven on the edge of a rail base, the legs of said clip including inwardly struck barbs each terminating in a linear biting edge extending generally parallel to the longitudinal extent of the rail, the legs of the clip each including an outwardly extending center portion whereby a wire perpendicular to the rail base edge and extending through the center portions adjacent the rail base may be held in a U-shape loop closely adjacent the rail base edge.

2. A clip as set forth in claim 1 wherein said lower leg each include two barbs.

3. A clip as set forth in claim 2 wherein said upper leg each include a single barb.

4. A clip as set forth in claim 3 wherein each upper leg barb is positioned substantially midway between the lower leg barbs.

5. A clip as set forth in claim 1 wherein each truncated biting edge extends at a slight angle with respect to the longitudinal extent of the rail base in the unstressed condition of the clip.

6. A clip as set forth in claim 5 wherein said truncated biting edges on each side of the clip extend symmetrically outwardly toward the clip edges at such slight angle.

7. A clip as set forth in claim 6 wherein the center portions of each leg flex as the clip is driven on the rail base edge to provide substantially uniform biting pressure along the biting edges.

* * * * *